United States Patent
Bassler

(10) Patent No.: US 7,090,617 B2
(45) Date of Patent: Aug. 15, 2006

(54) ACCELERATION LAUNCH STRATEGY FOR AN ELECTROMECHANICAL AUTOMATIC TRANSMISSION

(75) Inventor: Juergen Bassler, Winnenden (DE)

(73) Assignee: DaimlerChrysler Corporation, Auburn Hills, MI (US)

( * ) Notice: Subject to any disclaimer, the term of this patent is extended or adjusted under 35 U.S.C. 154(b) by 237 days.

(21) Appl. No.: 10/921,022

(22) Filed: Aug. 18, 2004

(65) Prior Publication Data

US 2006/0040788 A1 Feb. 23, 2006

(51) Int. Cl.
 *B60W 10/02* (2006.01)
(52) U.S. Cl. .............. 477/180; 477/171; 477/173; 477/176
(58) Field of Classification Search .......... 477/170, 477/171, 173, 176, 180
See application file for complete search history.

(56) References Cited

U.S. PATENT DOCUMENTS

| | | | |
|---|---|---|---|
| 5,704,872 A * | 1/1998 | Kosik et al. ............. | 477/74 |
| 6,012,561 A | 1/2000 | Reed, Jr. et al. | |
| 6,044,931 A | 4/2000 | Reed, Jr. et al. | |
| 6,364,813 B1 * | 4/2002 | Patel et al. ............. | 477/174 |
| 6,463,821 B1 | 10/2002 | Reed, Jr. et al. | |

FOREIGN PATENT DOCUMENTS

WO   WO 2006/000497 A1 * 1/2006

* cited by examiner

*Primary Examiner*—Ha Ho
(74) *Attorney, Agent, or Firm*—Ralph E. Smith

(57) ABSTRACT

A method for launching an automatic vehicle transmission utilizing dual clutches in place of a torque converter avoids clutch overheating, sudden launch or roll-back by placing a clutch in a slip mode only after the vehicle's brakes have been actuated and fully disengaging the clutch upon overheating detection. When launch is initiated, a first gear engaged and the brakes are released, the associated clutch is fully engaged to avoid overheating.

4 Claims, 3 Drawing Sheets

ACCELERATION LAUNCH STRATEGY FOR AN ELECTROMECHANICAL AUTOMATIC TRANSMISSION

FIELD OF THE INVENTION

The present invention relates to electromechanical automatic transmissions and more particularly to an acceleration launch strategy for an electromechanical automatic transmission.

BACKGROUND OF THE INVENTION

Electromechanical dual clutch transmissions that include automated electromechanical shifting mechanisms and methods are known in the art. For example, U.S. Pat. Nos. 6,463,821, 6,044,719 and 6,012,561, disclose a dual clutch electromechanical automatic transmission.

The dual-clutch transmission does not include a torque converter. Therefore, launch and acceleration is created by closing one of the clutches. Under normal driving conditions, the clutch is not completely engaged. Rather, it is only closed far enough to transfer engine torque without transferring torque peaks. This so called "slip control" approach enables smooth shifting as well as fast disengagement of the clutch. However, issues arise when the vehicle is held stationary on an incline. While a motor vehicle can be held on an incline with a slipping clutch, after some period of time, typically based on incline slope, vehicle weight, and temperature, the slipping clutch will overheat. To prevent overheating, the clutch may be fully engaged or disengaged. If the clutch is disengaged, the vehicle would roll back unexpectedly. If the clutch is fully engaged, the vehicle would suddenly launch. There is a need for a launch acceleration strategy which avoids these issues.

SUMMARY OF THE INVENTION

Accordingly, a method for launching an automatic vehicle transmission utilizing dual clutches in place of a torque converter recognizes a vehicle transmission launch request, engages a first gear, monitors an activation condition of a vehicle brake, fully engaging a clutch associated with the first gear when the vehicle brake is released to enable the vehicle to accelerate to an idling speed, partially disengaging the clutch to a slip condition whenever the brake is activated and fully disengaging the clutch from the slip condition whenever clutch temperature exceeds a predetermined overheating threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

The present invention pertains to a method for controlling a dual clutch automatic transmission. Although the present invention is applicable to virtually any dual clutch transmission, the method of the preferred embodiment is illustrated with the electromechanical automatic transmission disclosed in commonly assigned U.S. Pat. No. 6,012,561, which is hereby incorporated by reference in its entirety.

Figure 1:
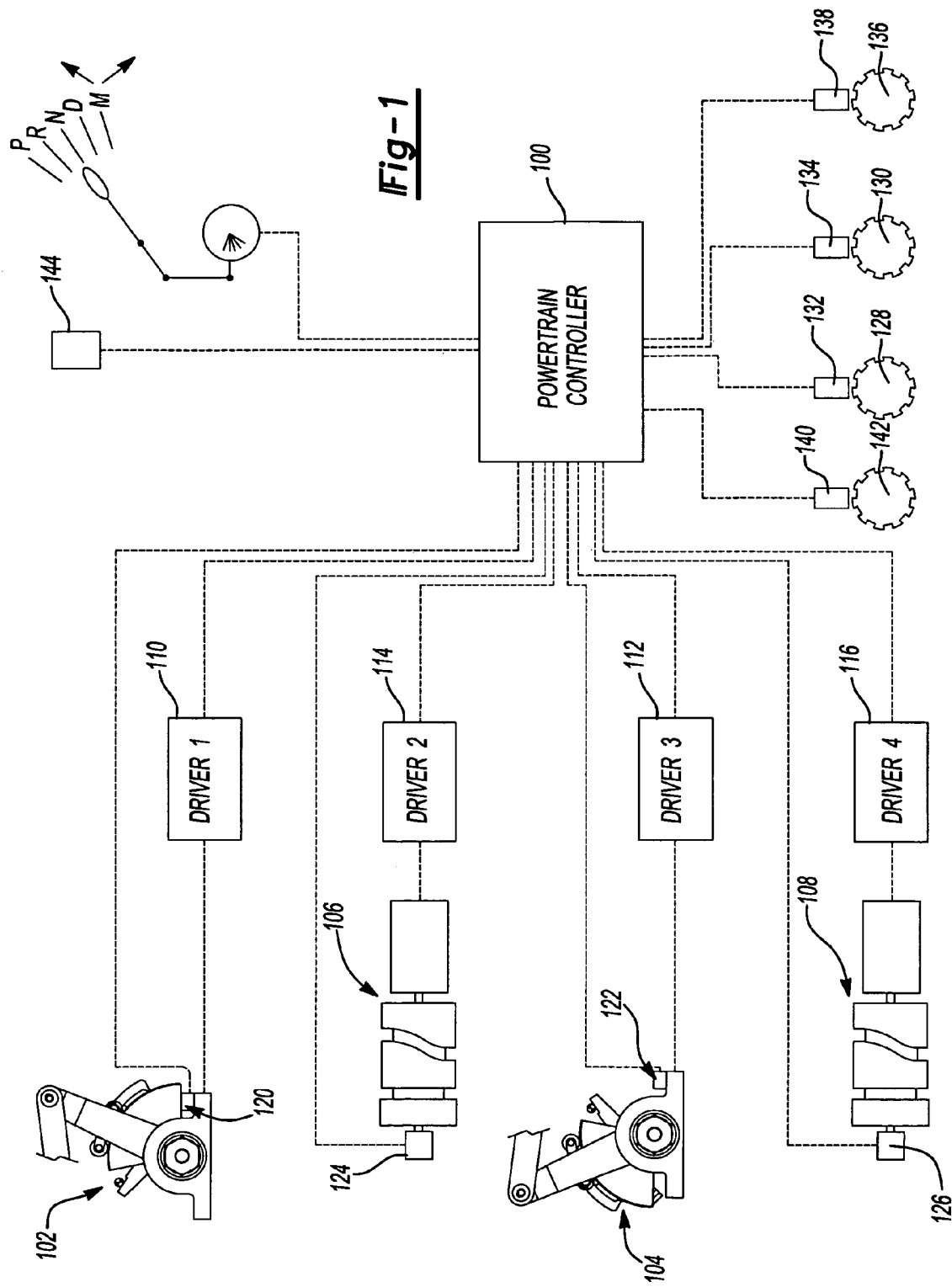
FIG. 1 is a schematic illustration of a control system for a dual clutch electromechanical automatic transmission.

With reference to FIG. 1, a powertrain controller 100 is provided for operating first and second clutch actuators 102, 104 and first and second shift actuators 106, 108. The powertrain controller 100 provides signals to the respective driver motors 110, 112 of the clutch actuators 102, 104 as well as to the respective driver motors 114, 116 of the shift actuators 106, 108. The powertrain controller 100 also monitors the position of the clutch actuators 102, 104 as well as the shift actuators 106, 108 via potentiometers 120, 122, 124, 126, respectively. Normal and uninterrupted power shifting between gears is accomplished by engaging the desired gear prior to a shift event. The transmission can be in two different gear ratios at once, preferably with only one clutch 102, 104 being engaged for transmitting power during normal operation. In order to shift to a new gear ratio, the current driving clutch will be released during normal operation via the corresponding clutch actuator and the released clutch will be engaged via the corresponding clutch actuator. The two clutch actuators perform a quick and smooth shift as directed by the powertrain controller 100 which monitors the speed of the transmission input shafts 128 and 130 via speed sensors 132 and 134, respectively, as well as the speed of the transmission output shaft 136 via a speed sensor 138. Alternatively, the controller 100 determines the speed of the input shafts 128 and 130 based upon the known gear ratio and the speed of the driven shaft 136 as detected by sensor 138. An engine speed sensor 140 is also provided and detects the speed of the flywheel 142. Based upon the accelerator pedal position as detected by sensor 144, the vehicle speed, and the current gear ratio, the powertrain controller 100 anticipates the next gear ratio of the next shift and drives the shift actuators 106, 108, accordingly, in order to engage the next gear ratio while the corresponding clutch actuator is in the disengaged position. As a gear is engaged, the corresponding input shaft which is disengaged from the engine output shaft becomes synchronized with the rotational speed of the transmission output shaft 136. At this time, the clutch which is associated with the current driving input shaft is disengaged and the other clutch is engaged in order to drive the input shaft associated with the selected gear.

Figure 2:
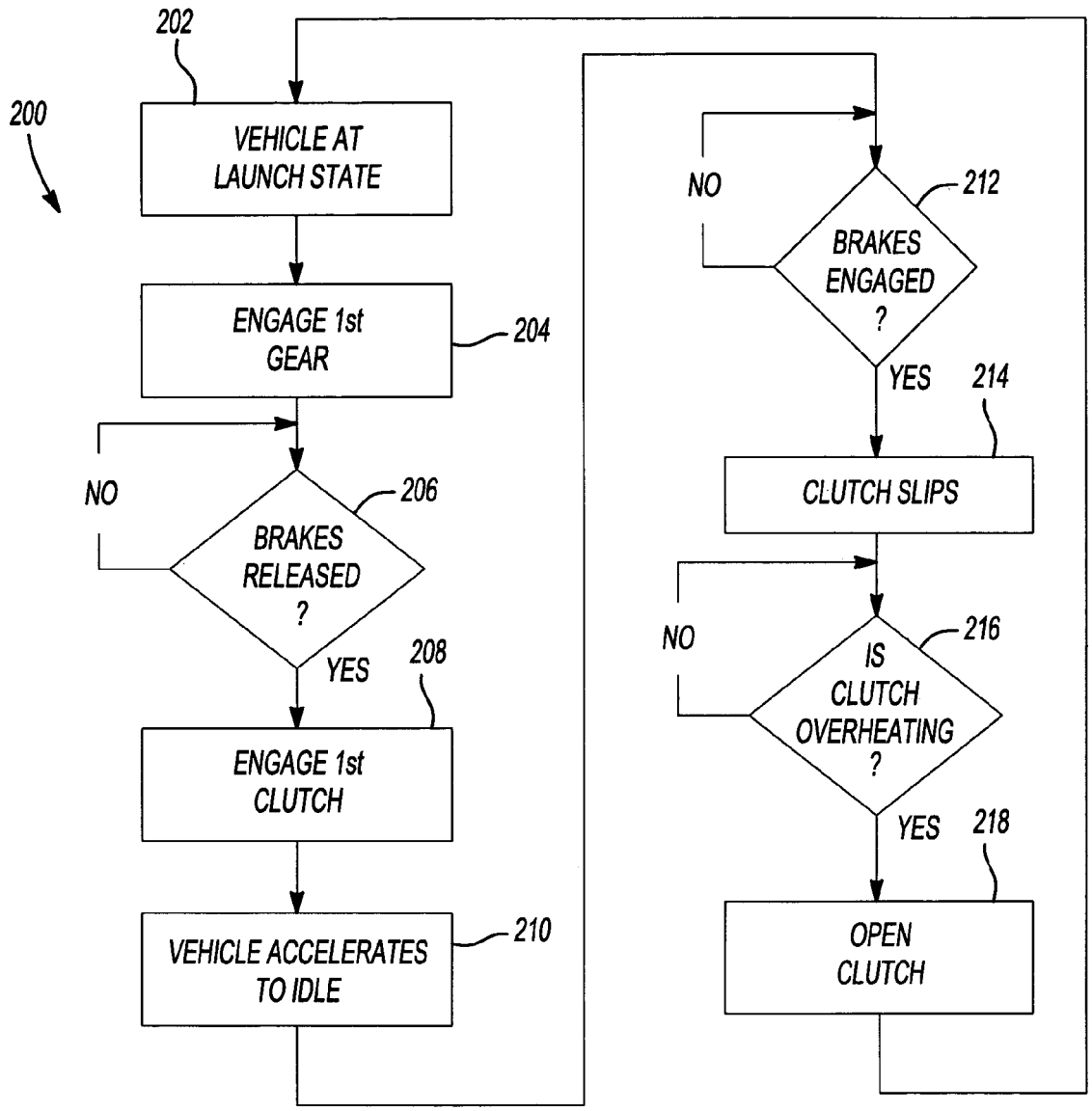
FIG. 2 is a flow chart illustrating the acceleration launch strategy for a dual clutch transmission according to the principles of the present invention.
Figure 3:
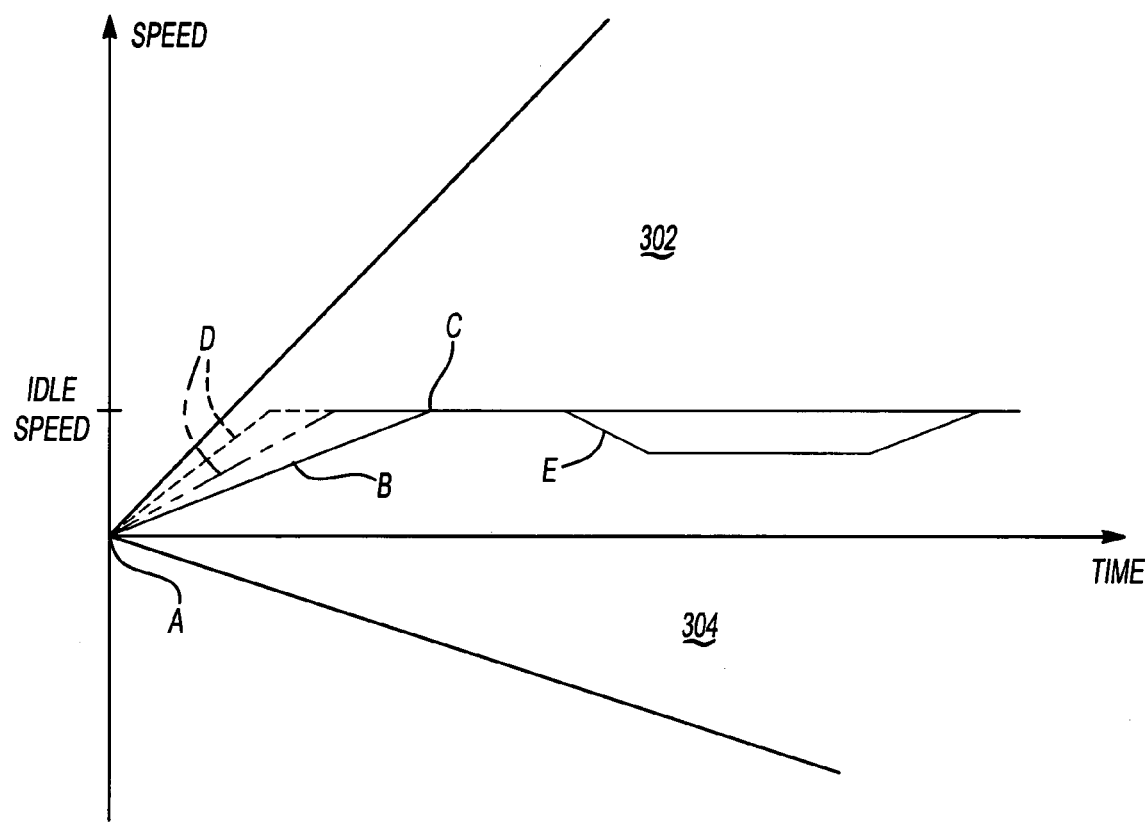
FIG. 3 is a graph illustrating the vehicle speed over time during the acceleration launch strategy of the present invention.

Referring to FIGS. 2 and 3, the method of launching a dual clutch automatic transmission using the acceleration launch strategy 200 will now be described. With regard to the description in FIG. 2, FIG. 3 graphically illustrates speed of the motor vehicle over time using the acceleration launch strategy 200.

The method 200 begins at step 202 with the motor vehicle in a "launch state". This "launch state" occurs when the motor vehicle is at rest (i.e., motor vehicle speed equals zero), corresponding to point "A" in FIG. 3.

At the launch state, the controller 100 selects the first gear at step 204. The controller 100 then determines if motor vehicle brakes are engaged at step 206. If the brakes are engaged, there is no danger of the clutches overheating. If, however, the brakes are released, the controller 100 closes the first clutch at step 208. As the clutch is closed, the motor vehicle will accelerate, indicated by the slope of the line indicated by reference "B" in FIG. 3. If the first clutch is already hot, slip time is shorter, therefore there is less energy generated and the motor vehicle may accelerate faster, indicated by lines "D" in FIG. 3.

The vehicle will accelerate to "idle" speed at step 210, indicated by reference "C" in FIG. 19. "Idle" speed is defined as the engine speed with no throttle when in first gear. By keeping the clutch fully engaged at step 208, the clutch is prevented from overheating.

Idle speed continues until such time as the controller 100 determines that the brakes have been engaged, indicated at decision block 212. The controller 100 then allows the clutch to slip at step 214. As a result of the braking, the vehicle speed will decrease, shown by a line indicated by reference "E" in FIG. 19.

If the clutch overheats during the slip event at decision block 216, the controller 100 opens the clutch at step 218. Since the brake is already engaged, there will be no unexpected rollback. The method 200 then repeats if another launch state is detected.

Area 302 of the graph of FIG. 3 indicates a high speed area that would occur if the transmission were equipped with a torque converter. Area 304 indicates roll-back speed that would occur with such a transmission system.

The invention has been described with reference to a preferred embodiment for the sake of example only. The scope of the invention is to be determined from an appropriate interpretation of the appended claims.

What is claimed is:

1. A method for launching an automatic vehicle transmission utilizing dual clutches in place of a torque converter, the method comprising:
   recognizing a vehicle transmission launch request;
   engaging a first gear;
   monitoring an activation condition of a vehicle brake;
   when the vehicle brake is released, fully engaging a clutch associated with the first gear enabling the vehicle to accelerate to an idling speed;
   partially disengaging the clutch to a slip condition whenever the brake is activated; and
   fully disengaging the clutch from the slip condition whenever clutch temperature exceeds a predetermined overheating threshold.

2. The method of claim 1 wherein fully engaging the clutch enables the vehicle to more rapidly accelerate to idling speed whenever a temperature of the clutch is above a predetermined level.

3. The method of claim 1 wherein the vehicle accelerates linearly to the idling speed.

4. The method of claim 2 wherein the vehicle accelerates linearly to the idling speed.

* * * * *